United States Patent
Siaud et al.

(10) Patent No.: US 12,356,436 B2
(45) Date of Patent: Jul. 8, 2025

(54) METHOD FOR ALLOCATING RADIO SIGNAL TRANSMISSION FREQUENCIES BETWEEN ONE OR MORE COMMUNICATION ENTITIES, ALLOWING A REDUCTION IN INTERFERENCES BETWEEN THE COMMUNICATION ENTITIES USING THE SAME FREQUENCY CHANNEL

(71) Applicant: Orange, Issy-les-Moulineaux (FR)

(72) Inventors: Isabelle Siaud, Chatillon (FR); Anne-Marie Ulmer-Moll, Chatillon (FR)

(73) Assignee: Orange, Issy-Les-Moulineaux (FR)

( * ) Notice: Subject to any disclaimer, the term of this patent is extended or adjusted under 35 U.S.C. 154(b) by 370 days.

(21) Appl. No.: 17/757,765

(22) PCT Filed: Dec. 17, 2020

(86) PCT No.: PCT/FR2020/052511
§ 371 (c)(1),
(2) Date: Jun. 20, 2022

(87) PCT Pub. No.: WO2021/123649
PCT Pub. Date: Jun. 24, 2021

(65) Prior Publication Data
US 2023/0344495 A1    Oct. 26, 2023

(30) Foreign Application Priority Data
Dec. 20, 2019   (FR) ..................... 1915357

(51) Int. Cl.
*H04B 7/06*     (2006.01)
*H04L 5/00*     (2006.01)
*H04W 72/51*    (2023.01)

(52) U.S. Cl.
CPC .......... *H04W 72/51* (2023.01); *H04L 5/0037* (2013.01); *H04L 5/0062* (2013.01); *H04L 5/0069* (2013.01)

(58) Field of Classification Search
CPC ... H04B 7/0617; H04B 7/0632; H04L 5/0037; H04L 5/0062; H04L 5/0069; H04W 16/10; H04W 72/51
See application file for complete search history.

(56) References Cited

U.S. PATENT DOCUMENTS

| | | | |
|---|---|---|---|
| 5,603,082 A | 2/1997 | Hamabe | |
| 2006/0181700 A1* | 8/2006 | Andrews | G01N 21/4738 356/237.2 |

(Continued)

FOREIGN PATENT DOCUMENTS

WO     WO 2015/082999 A1    6/2015

OTHER PUBLICATIONS

International Search Report for International Application No. PCT/FR2020/052511, dated Apr. 7, 2021.

*Primary Examiner* — Mansour Oveissi
(74) *Attorney, Agent, or Firm* — Knobbe, Martens, Olson & Bear, LLP

(57) ABSTRACT

Different frequency channel allocation techniques exist for transmissions. These frequency channel allocation techniques do not explicitly take into account the position of the terminal equipment and the antenna characteristics associated therewith. In addition, these techniques consume significant calculation power in order for the frequency channels to be allocated in the best possible way between the various terminal devices. The communication method is based on the selection of a single current transmission frequency using a metric referred to as metric representative of an overlap of collecting surfaces. The overlap metric evaluates an interference level associated with a spatial (Continued)

overlap between collecting surfaces of a first terminal device and an interfering device for a radio signal transmission frequency.

19 Claims, 3 Drawing Sheets

(56) References Cited

U.S. PATENT DOCUMENTS

2015/0109178 A1\* 4/2015 Hyde ............... H01Q 13/28
　　　　　　　　　　　　　　　　　　343/772
2016/0380363 A1　12/2016 Logothetis \* cited by examiner

METHOD FOR ALLOCATING RADIO SIGNAL TRANSMISSION FREQUENCIES BETWEEN ONE OR MORE COMMUNICATION ENTITIES, ALLOWING A REDUCTION IN INTERFERENCES BETWEEN THE COMMUNICATION ENTITIES USING THE SAME FREQUENCY CHANNEL

CROSS-REFERENCE TO RELATED APPLICATIONS

This application is filed under 35 U.S.C. § 371 as the U.S. National Phase of Application No. PCT/FR2020/052511 entitled "METHOD FOR ALLOCATING RADIO SIGNAL TRANSMISSION FREQUENCIES BETWEEN ONE OR MORE COMMUNICATION ENTITIES, ALLOWING A REDUCTION IN INTERFERENCES BETWEEN SAID COMMUNICATION ENTITIES USING THE SAME FREQUENCY CHANNEL" and filed Dec. 17, 2020, and which claims priority to FR 1915357 filed Dec. 20, 2019, each of which is incorporated by reference in its entirety.

BACKGROUND

Field

The field of the development is that of allocating radio-signal transmission frequencies. More precisely, the development relates to a technique for allocating radio-signal transmission frequencies between one or more communication entities, affording a reduction in interferences between these communication entities using the same frequency channel.

Description of the Related Technology

There are various techniques for allocating frequency channels for transmission that, in a given technology, use so-called DFS (Dynamic Frequency Selection) or DCA (Dynamic Channel Assignment) mechanisms.

The DFS mechanism is a mechanism associated with Wi-Fi technologies, which assigns frequency channels dedicated to Wi-Fi in order not to interfere with radar systems operating in the same frequency bands. Thus, the DFS mechanism consists in selecting a frequency not interfering with radar systems operating in the same frequency band, such as for example the 5 GHz band. The DFS mechanism was developed in the normative document referenced 802.11h published by the IEEE (Institute of Electrical and Electronics Engineers). The Wi-Fi device detects radar pulses that cause a blockage by a Wi-Fi access point of a transmission channel the frequency of which is shared with the radar system originating the transmission of the pulses.

The DCA mechanism is a mechanism relating to the allocation of frequency channels in a multicell context. The DCA mechanism dynamically allocates frequency channels in a cell using frequency channels available in adjacent cells. The algorithm is based on the probability of blocking of a frequency channel in a given cell and in the adjacent cells making it possible to reallocate the frequencies of the channels in another cell. Calculating this probability of blocking in the cell in question is based on an assumption of frequency-channels requirements that would follow a Poisson's law with a limited number of frequency channels available.

These techniques of allocating frequency channels do not explicitly take account of the position of the terminal equipment and the antenna characteristics that are associated therewith. In addition, these techniques consume a great deal of computing power in order to be able to best allocate the frequency channels between the various items of terminal equipment.

There is a need for a technique not having all or some of the aforementioned drawbacks.

SUMMARY

The development meets this need by proposing a method for communicating between communication equipment and at least one first item of terminal equipment at a (first) frequency of transmission of a radio signal, the communication method being implemented by the communication equipment and comprising the following steps: selecting a current frequency of transmission of the radio signal according to a metric representing an overlap of a first collecting surface of the first item of terminal equipment and of a second collecting surface of at least one second item of terminal equipment, referred to as interfering equipment, sending a radio signal at the current frequency.

Such a method is an alternative to the techniques for allocating frequency channels of the prior art.

The communication method is based on selecting a current transmission frequency using a metric referred to as a metric representing an overlap of collecting surfaces. The overlap metric evaluates an interference level associated with spatial overlap of collecting surfaces of a first item of terminal equipment and an item of interfering equipment for a transmission frequency of a radio signal. The interfering equipment is liable to interfere with the terminal equipment since it communicates with the communication equipment at the same frequency as the terminal equipment.

The solution proposed relates to the selection of a current transmission frequency of a radio signal for spatially disassociating the adjacent terminal equipment using the same transmission frequency of a radio signal for communicating with the communication equipment, which makes it possible to optimise the frequency resource in a multiuser context. The solution proposed aims to limit the multiuser interferences and to allow an adaptation of an antenna gain in reception for each point-to-point communication, which limits the monofrequency multiuser interferences and helps to reduce the radiated powers.

The solution proposed consists in selecting a current transmission frequency of a radio signal used for communicating between the communication equipment and at least one item of terminal equipment in order to avoid an overlap of the collecting surfaces of the antennas of adjacent terminal equipment. An adjustment of a solid angle of a reception communication beam is made using the transmission frequency of a radio signal that modifies the collecting surface of an antenna in reception. The solution described is based on selecting the transmission frequency of a radio signal that makes it possible to generate a collecting surface allowing the establishment of a communication between the communication equipment and the terminal equipment in question by limiting the spatio-frequency interferences with antennas of adjacent terminal equipment.

According to one feature of the communication method, the overlap metric is furthermore determined according to the relative geometric positions of the terminal equipment and of the interfering equipment (these relative positions define a so-called fictitious geometric collecting surface).

According to one feature of the communication method, the overlap metric is a ratio of a fictitious collecting surface to which the first item of terminal equipment and the interfering equipment belong to a half-sum of the first collecting surface and of the second collecting surface.

According to one feature of the communication method, the overlap metric is a ratio of a so-called fictitious collecting surface determined according to a geometric surface associated with the geometric positions of the first item of terminal equipment and of the interfering equipment to a half-sum of the first collecting surface and of the second collecting surface respectively of the first item of terminal equipment and of the interfering equipment.

According to another feature of the communication method, the collecting surface of the first item of terminal equipment, or of the interfering equipment, is determined according to a ratio of a value of a power of the radio signal received by the first item of terminal equipment or by the interfering equipment, at the first transmission frequency of the radio signal, to a product of a value of a transmission power of the radio signal and of a parameter representing the directivity of the radio signal transmitted by the communication equipment.

In a particular implementation of the communication method, the fictitious collecting surface id determined according to a geometric surface, determined by means of geometric positions of the first item of terminal equipment and of the interfering equipment with respect to the communication equipment, and a fictitious efficiency.

This fictitious collecting surface is calculated by considering the positions of the terminal equipment and of the interfering equipment expressed in spherical coordinates and considering the geometric surface of a spherical dome the axes of which correspond to the directions of the maximum radiation of the terminal equipment and of the interfering equipment. The fictitious collecting surface is then obtained by multiplying this geometric surface by a fictitious efficiency $\varepsilon_{GF}$ associated with a given type of antenna. In one example embodiment, the fictitious antenna is supposed to be an aperture antenna, which gives a coefficient $\varepsilon_{GF} \sim 1$.

When the overlap metric is less than or equal to a threshold, the method implements said step of selecting the current transmission frequency of transmission of the radio signal.

This is because, in such a case, there is a spatial overlap of the radio signals emitted/received by the terminal equipment and the interfering equipment. Selecting a new higher transmission frequency is then necessary to dissociate the collecting surfaces of the terminal equipment and of the interfering equipment.

When the overlap metric is less than or equal to a threshold, the communication method furthermore comprises a step of determining a new value of the overlap metric determined according to the value of the current transmission frequency of the radio signal.

If this metric is higher than the fixed threshold, then the terminal equipment and the interfering equipment are spatially dissociated and therefore do not interfere or interfere only a little.

When the overlap metric is higher than a threshold, the communication equipment continues to communicate at the first transmission frequency of the radio signal, i.e. the current frequency is identical to the first frequency.

Since the terminal equipment and the interfering equipment are spatially dissociated therefore do not interfere or interfere only a little, it is not necessary to select a new transmission frequency of a radio signal.

The development also relates to a method for determining a collecting surface of terminal equipment communicating with communication equipment at a first transmission frequency of a radio signal, the method being implemented by the terminal equipment and comprising the following steps: determining a collecting surface of the terminal equipment according to a ratio of a value of a power of the radio signal received by the terminal equipment at the first transmission frequency of the radio signal, to a product of a value of a transmission power of the radio signal and a parameter representing the directivity of the radio signal transmitted by the communication equipment, transmitting the collecting surface of the terminal equipment thus determined to the communication equipment.

One object of the development is communication equipment capable of communicating with at least one first item of terminal equipment at a first transmission frequency of a radio signal, the communication equipment comprising means for: selecting a current transmission frequency of the radio signal according to a metric representing an overlap of a first collecting surface of the first item of terminal equipment and of a second collecting surface of at least one second item of terminal equipment, referred to as interfering equipment, transmitting a radio signal at the current frequency.

Another object of the development is terminal equipment capable of determining a collecting surface allowing communication with communication equipment at a first transmission frequency of a radio signal, the terminal equipment comprising means for: determining a collecting surface of the terminal equipment according to a ratio of a value of a power of the radio signal received by the terminal equipment at the first transmission frequency of the radio signal, to a product of a value of a transmission power of the radio signal and of a parameter representing the directivity of the radio signal transmitted by the communication equipment, transmitting the collecting surface of the terminal equipment thus determined to the communication equipment.

Finally, the development relates to computer program products comprising program code instructions for implementing the methods as described above, when they are executed by a processor.

The development also relates to a recording medium that can be read by a computer on which computer programs are recorded comprising program code instructions for executing the steps of the methods according to the development as described above.

Such a recording medium may be any entity or device capable of storing the programs. For example, the medium may include a storage means, such as a ROM, for example a CD ROM or a microelectronic-circuit ROM, or a magnetic recording means, for example a USB key or a hard disc.

Moreover, such a recording medium may be a transmissible medium such as an electrical or optical signal, which can be routed via an electrical or optical cable, by radio or by other means, so that the computer programs that it contains can be executed remotely. The programs according to the development can in particular be downloaded on a network, for example the internet.

Alternatively, the recording medium may be an integrated circuit wherein the programs are incorporated, the circuit being adapted for executing or for being used in the execution of the methods that are the aforementioned objects of the development.

BRIEF DESCRIPTION OF THE DRAWINGS

Other aims, features and advantages of the development will emerge more clearly from the reading of the following description, given by way of simple illustrative and non-limitative example in relation to the figures, among which.

DETAILED DESCRIPTION OF CERTAIN ILLUSTRATIVE EMBODIMENTS

Figure 1:
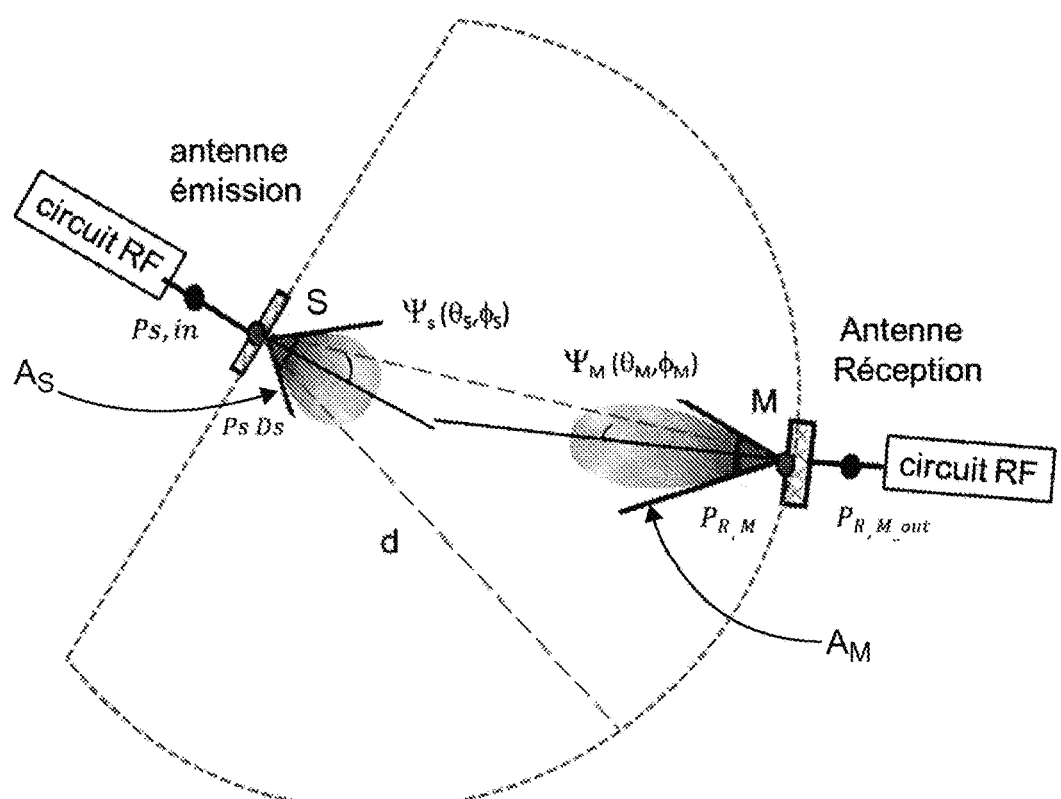
FIG. 1: this figure shows communication equipment and terminal equipment communicating at a first transmission frequency of a radio signal.

FIG. 1 shows communication equipment S, such as a base station or an access point, and terminal equipment M communicating at a first transmission frequency of a radio signal.

The collecting surface of an antenna $A_M$ of the terminal equipment M relates to the properties of the reception antenna and its ability to collect the energy of the radio signal transmitted by the communication equipment S on an effective surface.

The maximum effective surface of an antenna is deduced from the power of the radio signal received at the input of the receiving antenna ($P_{R,M}$) and the effective surface is deduced from the power of the radio signal received at the output of this same antenna ($P_{R,M,out}$) having regard to the transmission losses ($\varepsilon_R$) of the antenna $A_M$, also referred to as mismatch losses.

This (maximum) effective surface is called the (maximum) collecting surface of the antenna $A_M$, it depends on the directivity of the antenna $A_M$ in reception, i.e. on the gain of the antenna, on the direction of the incident radio signal if the transmission is not isotropic and on the angular frequency of the transmitted signal $\omega_c = 2\pi f_c$ where f is the transmission frequency of the radio signal.

The positions of the terminal equipment M and that of the communication equipment S are given in spherical coordinates $(r,\theta,\phi)=(r,\psi)$ with respect to the direction of the maximum radiation at the terminal equipment M and at the communication equipment S. These angles are shown on FIG. 1 for the communication equipment S $(r,\theta,\phi)_S=(0, \psi_S)$ and for the terminal equipment M $(r, \theta,\phi)_M=(d, \psi_M)$) where d is the distance between the communication equipment S and the terminal equipment M.

The ability of the antenna $A_M$ to collect the energy of the radio signal transmitted depends on the direction of the incident beam, i.e. on the directivity of the antenna $A_S$ of the communication equipment S and the directivity of the antenna $A_M$ of the terminal equipment M, as well as the distance separating the communication equipment S and the terminal equipment M, the losses of efficiency of the antennas $A_S \varepsilon_S$ and $A_M \varepsilon_M$ if the power at the inputs of the antennas ($P_{s,in}$ and $P_{R,M\_out}$) is taken into consideration.

The radiated power density $\rho_{i,s}(d)$ is a radiated power per unit surface. At a distance d, the radiated power per unit surface is, if the source antenna $A_S$ is isotropic, given by:

$$\rho_{i,S}(d) = \frac{P_s}{4\pi d^2} \quad (1-1)$$

where $P_s$ is the power radiated by the communication equipment S at the output of the antenna $A_S$, d the distance separating the communication equipment S and the terminal equipment M and $4\pi d^2$ the surface area of the sphere of radius d over which the power is radiated. If the radiation is directive, then the radiated power density will be weighted by the directivity of the transmitting antenna $A_S$ $D_S(\psi)$, corresponding to a concentration of the radiated power in the solid angle of the beam of the antenna connecting the communication equipment S to the terminal equipment M. This power density at the terminal equipment M is given by:

$$\rho_{i,S}(\psi, d) = \frac{P_s \cdot D_S(\psi)}{4\pi d^2} = \frac{P_{s,in} \cdot D_S(\psi)}{\varepsilon_S \cdot 4\pi \cdot d^2} = \frac{P_{s,in} \cdot G_S(\psi)}{4\pi \cdot d^2} \quad (1-2)$$

$G_S(\psi)=\varepsilon_S \cdot D_S(\psi)$ represents the gain of the antenna $A_S$ taking into account the transmission losses $\varepsilon_S$, pf the antenna connected to the RF circuit, $P_{s,in}$ is the power at the input of the antenna $A_S$, and $D_S(\psi)$ is the directivity of the antenna $A_S$ on transmission in the direction $\psi$.

The incident power received at the input of the antenna $A_M$ depends on the incident power density radiated by the communication equipment S and which is characterised by a directivity $D_S(\psi_s=\theta_s, \phi_s)$, at a distance d from the communication equipment S. The reception point being characterised by $M(\psi_M, d)$, the incident power density at the terminal equipment M depends on the directivity of the antenna $A_S$ on transmission in the transmitter-receiver direction in the vicinity of the position of the terminal equipment M, i.e. $D_S(\psi_M)$. The incident power density at the terminal equipment M $\rho_{i,s}(\psi_M, d)$, is expressed in the form:

$$\rho_{i,S}(\psi_M, d) = \frac{P_s \cdot D_S(\psi_M)}{4\pi d^2} = \frac{P_{s,in} \cdot G_S(\psi_M)}{4\pi d^2} \quad (1-3)$$

The power received at the input of the antenna $A_M$ is the product of the incident power density $\rho_{i,s}(\psi_M, d)$ and of the maximum collecting surface of the antenna $A_M$ in reception $S_{cmax,M}(f_c, \psi_S)$ taking account of the direction of the radio signal transmitted by the communication equipment S and the directivity of the antenna $A_M$. In other words, the maximum collecting surface of the antenna $A_M$ depends on the incident direction of the radio signal transmitted over the effective surface of the antenna $A_M$, i.e.:

$$P_{R,M}(\psi_M, d) = \frac{Ps \cdot D_S(\psi_M)}{4\pi d^2} S_{cmax,M}(f_c, \psi_S) \quad (1-4)$$

$$S_{cmax,M}(f_c, \psi_S) = \frac{\lambda^2}{4\pi} D_M(\psi_S) = \frac{c^2}{4\pi \cdot f_c^2} D_M(\psi_S) \quad (1-5)$$

The collecting surface of an antenna depends on the directivity of the antenna in reception and on the transmission frequency of the radio signal where $\lambda$ is the wavelength of the radio signal transmitted. λ is connected to the transmission frequency of the radio signal $f_c$ and the speed of light c, $f_c=c/\lambda$.

The gain of an antenna $G_M(\psi)$ is proportional to the directivity of this antenna and takes account of the mismatch losses, i.e. $\varepsilon_M$ for the receiving antenna when the antenna is connected to an RF circuit $$G_M(\psi) = \varepsilon_M D_M(\psi) \quad (1-6)$$

$$S_{c,M}(f_c, \psi) = \varepsilon_M \cdot S_{c\,max,M}(f_c, \psi) \frac{\lambda^2}{4\pi} G_M(\psi) \quad (1-7)$$

The power $P_{R,M\_out}(\psi_M, d)$, received at the input of the RF circuit, which takes account of the loss of efficiency the antenna $\varepsilon_M$ is written:

$$P_{R,M_{out}}(\psi_M, d) = \quad (1-8)$$
$$\frac{Ps \cdot D_S(\psi_M)}{4\pi d^2} \varepsilon_M \cdot S_{c\,max,M}(f_c, \psi_S) = \frac{Ps \cdot D_S(\psi_M)}{4\pi d^2} S_{c,M}(f_c, \psi_S)$$
$$= \frac{P_{s,in} \cdot G_S(\psi_M)}{4\pi d^2} S_{c,M}(f_c, \psi_S)$$

The collecting surface of an antenna $S_{c,M}$ ($f_c$, $\psi_S$) in reception is connected to its directivity by the following formula:

$$S_{c,M}(f_c, \psi) = \frac{\lambda^2}{4\pi} \varepsilon_M D_M(\psi) = \frac{c^2}{4\pi \cdot f_c} \varepsilon_M D_M(\psi) = \frac{c^2}{4\pi \cdot f_c^2} G_M(\psi) \quad (1-9)$$

This formula is derived from the expression of the Poynting vector norm that gives the power density per unit surface radiated at a distance d from a source and its integration on the solid angle of a beam corresponding to the solid angle through which all the radiated power is concentrated. Equation 1-9 shows that the collecting surface decreases when the transmission frequency of a radio signal increases, for a given antenna gain. The collecting surface of an antenna depends on the directivity of the antenna, on the direction of the incident radio signal and on the transmission frequency of the radio signal and collected by the receiving antenna. It does not explicitly depend on the distance d. The power density on the other hand depends on the distance d. The directivity of an antenna provides the angular distribution ($\psi=\theta$, $\phi$) of the intensity of the radiation of the antenna.

The total power received by the terminal equipment M is given by:

$$P_{R,M}(\psi_M, d, \lambda) = \quad (1-10)$$
$$\frac{Ps \cdot D_S(\psi_M)}{4\pi d^2} \frac{\lambda^2 \cdot D_M(\psi_S)}{4\pi} = Ps \cdot \left(\frac{\lambda}{4\pi d}\right)^2 D_S(\psi_M) \cdot D_M(\psi_S)$$

Which leads to the Friis formula:

$$\frac{P_{R,M}(\psi_M, d, \lambda)}{P_S} = \left(\frac{\lambda}{4\pi d}\right)^2 D_S(\psi_M) \cdot D_M(\psi_S) \quad (1-11)$$

$$\frac{P_{R,M\,out}(\psi_M, d, \lambda)}{P_{S,in}} = \left(\frac{\lambda}{4\pi d}\right)^2 G_S(\psi_M) \cdot G_M(\psi_S) \quad (1-12)$$

The collecting surface of an antenna can be connected to a geometric surface or to a geometric antenna length. When it is a case of an aperture antenna, such as an antenna of the cornet type for example, the aperture efficiency of the antenna $\varepsilon_G$ in the direction of the maximum radiation $\psi_0$, is connected to the maximum collecting surface by:

$$S_{cmax,M}(f_c,\psi_0)=\varepsilon_G S_G == > S_{c,M}(f_c,\psi_0)=\varepsilon_G \varepsilon_M S_G$$

where $\varepsilon_G$ can vary between 1 and 0.5, according to the geometry of the antenna and the expression of the radiated field at the geometric surface of the antenna.

Figure 2:
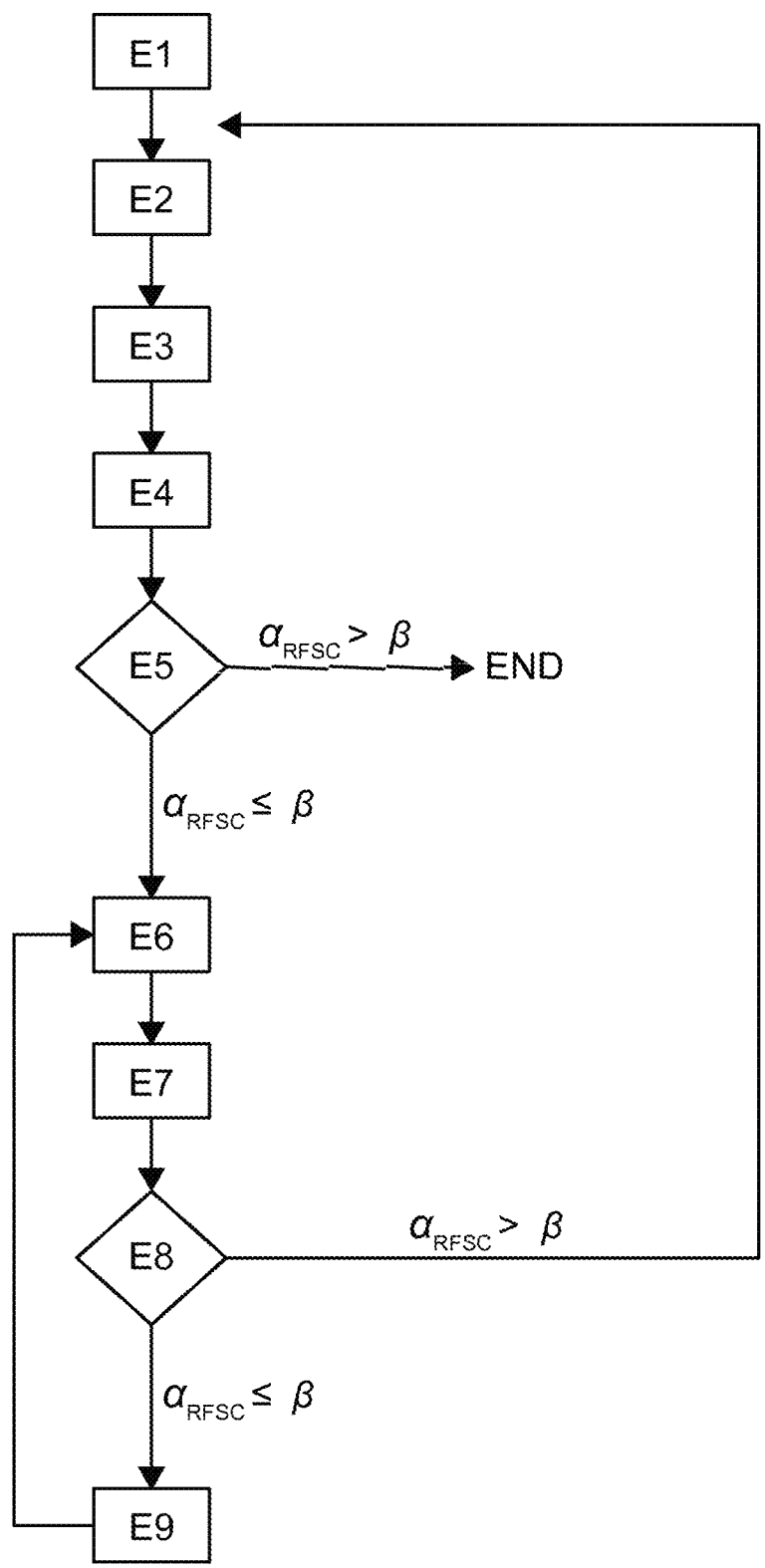
FIG. 2: this figure shows the steps of the communication method and method of computing a collecting surface implemented by the communication equipment and the terminal equipment.

FIG. 2 shows the steps of the communication method and method of computing a collecting surface implemented by the communication equipment S and the terminal equipment M.

In a step E1, the source equipment S transmits a radio signal to the terminal equipment M and to at least one second item of terminal equipment referred to as interfering equipment I1. Such a radio signal is transmitted at a first transmission frequency $f_c$.

In a step E2, which can be implemented by the communication equipment S or by each of the items of terminal equipment M and I1, a collecting surface of the terminal equipment M and of the interfering equipment I1 is calculated.

Figure 3:
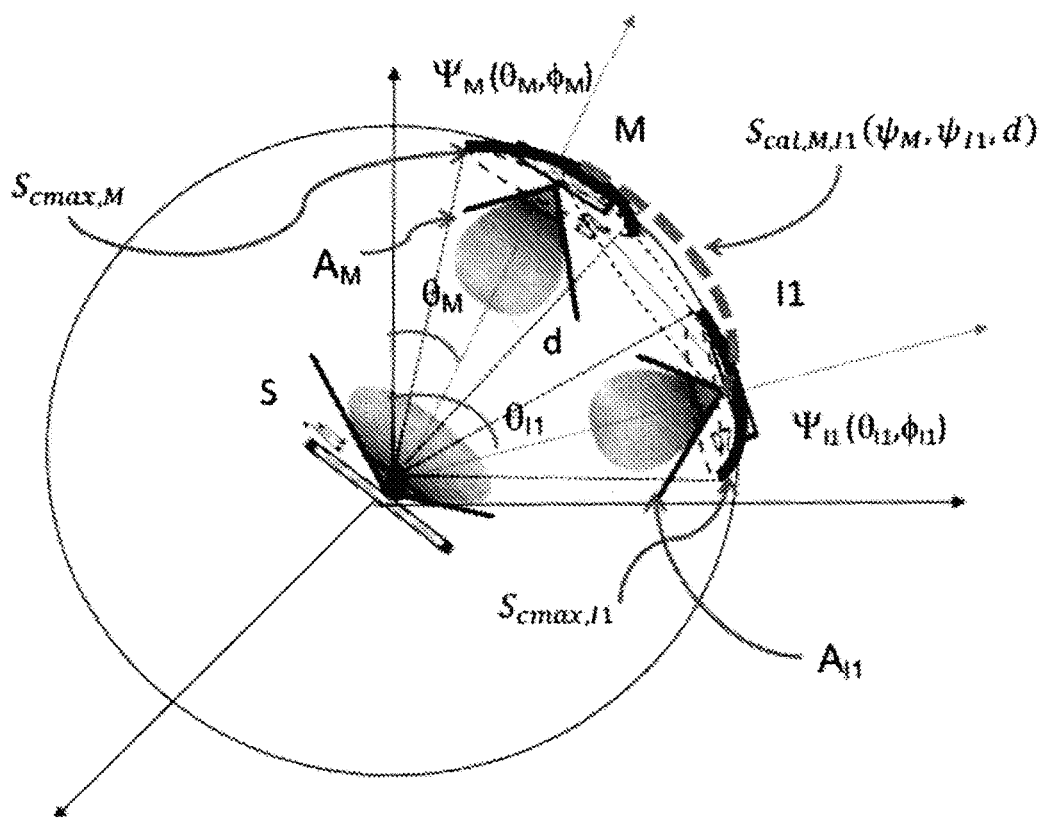
FIG. 3: this figure shows the collecting surfaces of terminal equipment and of interfering equipment.

With reference to [FIG. 3], using the measurement of the power received at the terminal equipment M and I1 at the inputs of their respective antennas $A_M$ et $A_{I1}$, the maximum collecting surfaces of the terminal equipment M and I1 are deduced from the following formula:

$$S_{cmax,M}(f_c, \psi_S) = \frac{P_{R,M}(\psi_M, d)}{Ps \cdot D_S(\psi_M)} \cdot 4\pi d^2 \quad S_{cmax,I1}(f_c, \psi_S) = \frac{P_{R,I1}(\psi_{I1}, d)}{Ps \cdot D_S(\psi_{I1})} \cdot 4\pi d^2 \quad (2-1)$$

When the step E2 is implemented by the terminal equipment M and I1, the maximum collecting surfaces thus calculated are transmitted to the communication equipment S.

When the step E2 is implemented by the communication equipment S, the terminal equipment M and I1 transmits measurements of received power of a received signal or RSSI (Received Signal Strength Indication) to the communication equipment S so that the latter can calculate the maximum collecting surfaces of the terminal equipment M and I1.

In a step E3, knowing the positions of the terminal equipment M and I1, i.e. the angles $\psi_M$ and $\psi_{I1}$, assumed at the same distance d from the communication equipment S, the geometric surface of a spherical dome connecting the terminal equipment M and I1, by means of the following formula:

$$S_{cal,M,I1}(\psi_M, \psi_{I1}, d) = \qquad (2\text{-}2)$$

$$2\pi \cdot d^2 \cdot \sin\left(\frac{\|\theta_M - \theta_{I1}\|}{2}\right) \cdot \left(1 - \cos\left(\frac{\|\theta_M - \theta_{I1}\|}{2}\right)\right)$$

The fictitious collecting surface can be expressed by means of a mutual fictitious efficiency $\varepsilon_{GF}$ connecting the geometric surface $S_{cal,M,I1}(\psi_M, \psi_{I1}, d)$ to its maximum collecting surface: $\varepsilon_G \cdot S_{cal,M,I1}(\psi_M, \psi_{I1}, d)$.

In a step E4, the communication equipment S determines a first value of a metric $\alpha_{RFSC}$r representing an overlap of the collecting surface of the terminal equipment M and the collecting surface of the interfering equipment I1.

The assumption is made that the fictitious antenna connecting the terminal equipment M and I1 is without losses, i.e. that the equivalent collecting surface is equal to the maximum equivalent collecting surface. Moreover, it is assumed that the aperture efficiency of the fictitious antenna is equal to 1, in accordance with an aperture antenna. However, according to the transmission conditions, the coefficient $\varepsilon_G$ may be less than 1. The overlap metric $\alpha_{RFSC}$ can therefore be calculated by taking account of the power levels received at the output of the antennas $A_M$ et $A_{I1}$, i.e. at the input of the RF (radiofrequency) circuits as follows:

$$\alpha_{RFSC} = \frac{\varepsilon_{GF} \cdot S_{cal,M,I1}(\psi_M, \psi_{I1}, d)}{\frac{S_{c,M}(f_c, \psi_S) + S_{c,I1}(f_c, \psi_S)}{2}} \qquad (2\text{-}3)$$

i.e.

$$\alpha_{RFSC} = \frac{Ps \cdot D_S(\psi_{I1}) \cdot D_S(\psi_M)}{P_{R,M}(\psi_M, d) \cdot D_S(\psi_{I1}) + P_{R,I1}(\psi_{I1}, d) \cdot D_S(\psi_M)} \qquad (2\text{-}4)$$

$$\varepsilon_{GF} \cdot \sin\left(\frac{\|\theta_M - \theta_{I1}\|}{2}\right) \cdot \left(1 - \cos\left(\frac{\|\theta_M - \theta_{I1}\|}{2}\right)\right)$$

Which can again be written, taking account of equation 1-6:

$$\alpha_{RFSC} = \frac{Ps, \text{in} \cdot G_S(\psi_{I1}) \cdot G_S(\psi_M)}{P_{R,M\_out}(\psi_M, d) \cdot G_S(\psi_{I1}) + P_{R,I1\_out}(\psi_{I1}, d) \cdot G_S(\psi_M)} \qquad (2\text{-}5)$$

$$\varepsilon_{GF} \cdot \sin\left(\frac{\|\theta_M - \theta_{I1}\|}{2}\right) \cdot \left(1 - \cos\left(\frac{\|\theta_M - \theta_{I1}\|}{2}\right)\right)$$

The numerical value of the overlap metric $\alpha_{RFSC}$ is deduced simply from the location of the terminal equipment M and I1 ($\theta_M$ and $\theta_{I1}$), from knowledge of the input power $P_{s,in}$ of the communication equipment S. from the antenna gain of the communication equipment S in the direction $\psi_{I1}$ and $\psi_M$, from a measurement of the powers received at the input of the Rf circuits of the terminal equipment M and I1 and from a value fixed arbitrarily for $\varepsilon_G$.

In a step E5, the value of the overlap metric $\alpha_{RFSC}$ determined during the step E4 is compared with a threshold $\beta$.

When the value of the overlap metric $\alpha_{RFSC}$ is strictly greater than the threshold $\beta$, then the terminal equipment M and the interfering equipment I1 are spatially dissociated and therefore do not interfere or interfere only a little. In other words, their collecting surfaces do not overlap.

Thus the terminal equipment M and I1 can both receive the same radio signal transmitted at the same frequency $f_c$.

When the value of the overlap metric $\alpha_{RFSC}$ is less than or equal to the threshold $\beta$ then the terminal equipment M and the interfering equipment I1 interfere spatially.

It is therefore necessary to modify the transmission frequency of the radio signal so as to reduce the collecting surfaces of the terminal equipment M and I1.

Thus, in a step E6, a new transmission frequency of a radio signal $f_{c,i}$ is selected from a set of possible transmission frequencies. The possible transmission frequencies may belong to different spectral bands, for example the spectral bands V and E if it is a radio signal transmitted in millimetric band.

Once the new transmission frequency of the radio signal has been selected, referred to as the current frequency, a new value of the overlap metric $\alpha_{RFSC}$ is calculated during a step E7.

The new value of the overlap metric $\alpha_{RFSC}$ is obtained by means of the following equivalent formula:

$$S_{cmax,M}(f_{c,i}, \psi_S) + S_{cmax,I1}(f_{c,i}, \psi_S) = \frac{c^2}{4\pi f_{c,i}^2} D_M(\psi_S) + D_{I1}(\psi_S) \qquad (2\text{-}6)$$

$$S_{c,M}(f_{c,i}, \psi_S) + S_{c,I1}(f_{c,i}, \psi_S) = \frac{c^2}{4\pi f_{c,i}^2} G_M(\psi_S) + G_{I1}(\psi_S)$$

$$\alpha_{RFSC} = \varepsilon_{GF} \cdot \frac{2\pi \cdot d^2 \cdot \sin\left(\frac{\|\theta_M - \theta_{I1}\|}{2}\right) \cdot \left(1 - \cos\left(\frac{\|\theta_M - \theta_{I1}\|}{2}\right)\right)}{\frac{c^2}{8\pi f_{c,1}^2}(G_M(\psi_S) + G_{I1}(\psi_S))} \qquad (2\text{-}7)$$

$$= \varepsilon_{GF} \cdot f_{c,i}^2 \cdot \frac{(4\pi \cdot d)^2}{c^2} \frac{\sin\left(\frac{\|\theta_M - \theta_{I1}\|}{2}\right) \cdot \left(1 - \cos\left(\frac{\|\theta_M - \theta_{I1}\|}{2}\right)\right)}{(G_M(\psi_S) + G_{I1}(\psi_S))}$$

In a step E8, a new value of the overlap metric $\alpha_{RFSC}$ determined during step E7 is compared with the threshold $\beta$.

When the new value of the overlap metric $\alpha_{RFSC}$ is less than the threshold $\beta$ then the terminal equipment M and I1 interferes spatially. In such a case, a new transmission frequency of a radio signal $f_{c,j}$ is selected, referred to as the current frequency, from the set of possible transmission frequencies during a step E9. Steps E7 to E9 are repeated until the new value of the overlap metric $\alpha_{RFSC}$ is strictly higher than the threshold $\beta$.

When the value of the overlap metric $\alpha_{RFSC}$ is strictly higher than the threshold $\beta$. Then the terminal equipment M and the interfering equipment I1 are spatially dissociated and do not interfere or interfere only a little.

Steps E1 to E9 are implemented repeatedly over time.

The communication method proposed can advantageously be implemented by communication equipment S having a multiple antenna composed of several groups of elementary antennas, capable of transmitting at different frequencies. Each group of elementary antennas can transmit at a given transmission frequency making it possible to implement a beam adjustment technique known for the transmission frequency in question.

The communication method proposed can be combined with a method for adapting weighting of elementary antennas that modifies the collecting surface of the multiple antenna in reception.

The beam is adjusted by modifying the wavelength of the collecting surface, i.e. the transmission frequency, by means of a method for allocating multiband transmission frequencies. Such a weighting adaptation method consists in selecting the transmission frequency, referred to as the current frequency, in a wide range of frequencies combined with a calculation of the collecting surface of an antenna in reception.

A multifrequency massive MIMO antenna consisting of N elementary antennas distributed in NG groups of antennas operating over no more than NG distinct transmission frequencies can be used for implementing the change in transmission frequency and the modification of the collecting surface. A SISO antenna can also be used with NG frequencies included in the bandwidth of the antenna.

Figure 4:
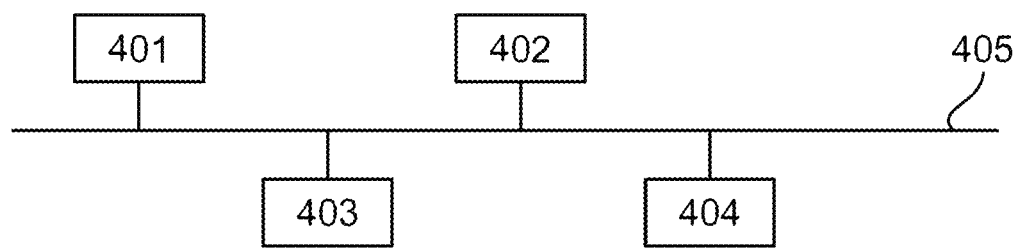
FIG. 4: this figure shows communication equipment able to implement the various embodiments of the communication method.

FIG. 4 shows communication equipment S able to implement the various embodiments of the communication method according to FIG. 3.

Communication equipment S can comprise at least one hardware processor 401, a storage unit 402, an interface 403 and at least one network interface 404 that are connected together through a bus 405. Naturally, the elements constituting the communication equipment S may be connected by means of a connection other than a bus.

The processor 401 controls the operations of the communication equipment S. The storage unit 402 stores at least one program for implementing the method according to an embodiment to be implemented by the processor 401, and various data, such as parameters used for calculations made by the processor 401, intermediate data of calculations made by the processor 401, etc. The processor 401 can be formed by any known suitable hardware or software, or by any combination of hardware and software. For example, the processor 401 can be formed by dedicated hardware such as a processing circuit, or by a programmable processing unit such as a central processing unit that executes a program stored in a memory thereof.

The storage unit 402 can be formed by any suitable means capable of storing the program or programs and data in a way that can be read by a computer. Examples of storage unit 402 comprise computer-readable non-transient storage media such as semiconductor memory devices and magnetic, optical or magneto-optical recording media loaded in a read and write unit.

The interface 403 provides an interface between the communication equipment S of other equipment not shown in the figures.

At least one network interface 404 provides a connection between the communication equipment S and the terminal equipment M and I1.

Figure 5:
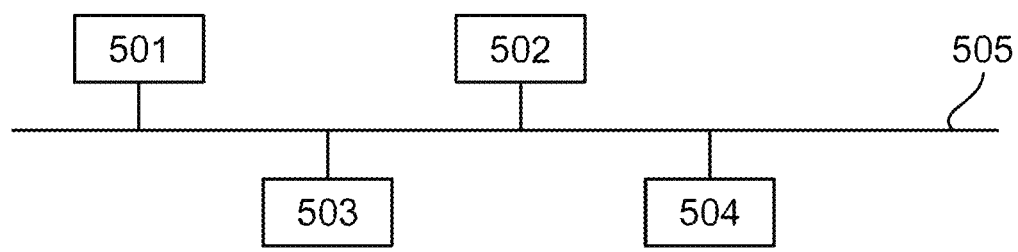
FIG. 5: this figure shows terminal equipment M, I1 able to implement the various embodiments of the method for determining a collecting surface.

FIG. 5 shows terminal equipment M, I1 able to implement the various embodiments of the method for determining a collecting surface according to FIG. 3.

Terminal equipment M, I1 can comprise at least one hardware processor 501, a storage unit 502, an interface 503 and at least one network interface 504 that are connected together through a bus 505. Naturally, the elements constituting the communication equipment S may be connected by means of a connection other than a bus.

The processor 501 controls the operations of the terminal equipment M and I1. The storage unit 502 stores at least one program for implementing the method according to an embodiment to be implemented by the processor 501, and various data, such as parameters used for calculations made by the processor 501, intermediate data of calculations made by the processor 501, etc. The processor 501 can be formed by any known suitable hardware or software, or by a combination of hardware and software. For example, the processor 501 can be formed by dedicated hardware such as a processing circuit, or by a programmable processing unit such as a central processing unit that executes a program stored in a memory thereof.

The storage unit 502 can be formed by any suitable means capable of storing the program or programs and data in a way that can be read by a computer. Examples of storage unit 502 comprise computer-readable non-transient storage media such as semiconductor memory devices and magnetic, optical or magneto-optical recording media loaded in a read and write unit.

The interface 503 provides an interface between the terminal equipment M and I1 of other equipment not shown in the figures.

At least one network interface 504 provides a connection between the terminal equipment M and I1 and the communication equipment S.

The invention claimed is:

1. A method of communicating between communication equipment and at least one first item of terminal equipment at a first transmission frequency among a plurality of frequencies of transmission of a radio signal, the communication method being implemented by the communication equipment and comprising:
   determining, for a given frequency among the plurality of transmission frequencies, a metric representing an overlap of a first collecting surface of the first item of terminal equipment and of a second collecting surface of at least one second item of terminal equipment, referred to as interfering equipment; and
   selecting a current transmission frequency among the plurality of frequencies of transmission of the radio signal according to the metric determined;
   the overlap metric being a ratio of a fictitious collecting surface determined according to a geometric surface associated with the geometric positions of the first item of terminal equipment and of the interfering equipment to a half-sum of the first collecting surface and of the second collecting surface respectively of the first item of terminal equipment and of the interfering equipment.

2. The communication method according to claim 1, wherein the collecting surface of the first item of terminal equipment, or of the interfering equipment, is determined according to a ratio of a value of a power of the radio signal received by the first item of terminal equipment or by the interfering equipment to a product of a value of a transmission power of the radio signal and a parameter representing directivity of the radio signal transmitted by the communication equipment, at the given transmission frequency of the radio signal.

3. The communication method according to claim 1, wherein the fictitious collecting surface is determined according to a geometric surface determined according to geometric positions of the first item of terminal equipment and of the interfering equipment with respect to the communication equipment and a fictitious efficiency.

4. The communication method according to claim 1, wherein, when the overlap metric is below or equal to a threshold, the current frequency selected among the plurality of frequencies is different from the given frequency.

5. The communication method according to claim 4, wherein the given frequency takes the value of the current frequency and the method repeats the determination and selection steps for this given frequency.

6. The communication method according to claim 1, wherein, when the overlap metric is higher than a threshold, the current frequency selected from the plurality of frequencies is equal to the given frequency.

7. A processing circuit comprising a processor and a memory, the memory storing program code instructions of a computer program for implementing the method according to claim 1, when the computer program is executed by the processor.

8. The communication method according to claim 1, wherein the metric represents an overlap
of a first collecting surface of the first item of terminal equipment communicating with the communication equipment and
of a second collecting surface of the at least one interfering equipment communicating with the communication equipment.

9. A method of determining a collecting surface of terminal equipment communicating with communication equipment at a transmission frequency of a radio signal among a plurality of transmission frequencies, the method being implemented by the terminal equipment and comprising:
determining a collecting surface of the terminal equipment according to a ratio of a value of a power of the radio signal received by the terminal equipment at the first transmission frequency of the radio signal, to a product of value of a transmission power of the radio signal and a parameter representing directivity of the radio signal transmitted by the communication equipment; and
transmitting the collecting surface of the terminal equipment thus determined to the communication equipment.

10. A processing circuit comprising a processor and a memory, the memory storing program code instructions of a computer program for implementing the method according to claim 9, when the computer program is executed by the processor.

11. A communication equipment capable of communicating with at least one first item of terminal equipment at a first transmission frequency among a plurality of transmission frequencies of a radio signal, the communication equipment comprising means for:
determining for a given frequency among the plurality of transmission frequencies a metric representing an overlap of a first collecting surface of the first item of terminal equipment and of a second collecting surface of at least one second item of terminal equipment, referred to as interfering equipment;
selecting a current transmission frequency from the plurality of transmission frequencies of the radio signal according to the metric determined; and
transmitting a radio signal at the current frequency,
the overlap metric being a ratio of a fictitious collecting surface determined according to a geometric surface associated with the geometric positions of the first item of terminal equipment and of the interfering equipment to a half-sum of the first collecting surface and of the second collecting surface respectively of the first item of terminal equipment and of the interfering equipment.

12. A terminal equipment capable of determining a collecting surface affording communication with communication equipment at a given transmission frequency among a plurality of transmission frequencies of a radio signal, the terminal equipment comprising means for:
determining a collecting surface of the terminal equipment according to a ratio of a value of a power of the radio signal received by the terminal equipment at the given transmission frequency of the radio signal, to a product of the value of a transmission power of the radio signal and of a parameter representing directivity of the radio signal transmitted by the communication equipment; and
transmitting the collecting surface of the terminal equipment thus determined to the communication equipment.

13. A method of communicating between communication equipment and at least one first item of terminal equipment at a first transmission frequency among a plurality of frequencies of transmission of a radio signal, the communication method being implemented by the communication equipment and comprising:
determining, for a given frequency among the plurality of transmission frequencies, a metric representing an overlap of a first collecting surface of the first item of terminal equipment and of a second collecting surface of at least one second item of terminal equipment, referred to as interfering equipment; and
selecting a current transmission frequency among the plurality of frequencies of transmission of the radio signal according to the metric determined;
the collecting surface of the first item of terminal equipment, or of the interfering equipment, being determined according to a ratio of a value of a power of the radio signal received by the first item of terminal equipment or by the interfering equipment to a product of a value of a transmission power of the radio signal and a parameter representing directivity of the radio signal transmitted by the communication equipment, at the given transmission frequency of the radio signal.

14. The communication method according to claim 13, wherein the overlap metric furthermore depends on the relative geometric positions of the terminal equipment and of the interfering equipment.

15. The communication method according to claim 14, wherein the overlap metric is a ratio of a fictitious collecting surface determined according to a geometric surface associated with the geometric positions of the first item of terminal equipment and of the interfering equipment to a half-sum of the first collecting surface and of the second collecting surface respectively of the first item of terminal equipment and of the interfering equipment.

16. The communication method according to claim 15, wherein the fictitious collecting surface is determined according to a geometric surface determined according to geometric positions of the first item of terminal equipment and of the interfering equipment with respect to the communication equipment and a fictitious efficiency.

17. The communication method according to claim 13, wherein, when the overlap metric is below or equal to a threshold, the current frequency selected among the plurality of frequencies is different from the given frequency.

18. The communication method according to claim 17, wherein the given frequency takes the value of the current frequency and the method repeats the determination and selection steps for this given frequency.

19. The communication method according to claim 13, wherein, when the overlap metric is higher than a threshold, the current frequency selected from the plurality of frequencies is equal to the given frequency.

* * * * *